July 14, 1931.  J. I. HULL  1,814,809
PROTECTIVE SYSTEM FOR ALTERNATING CURRENT COMMUTATOR MOTORS
Filed April 20, 1928
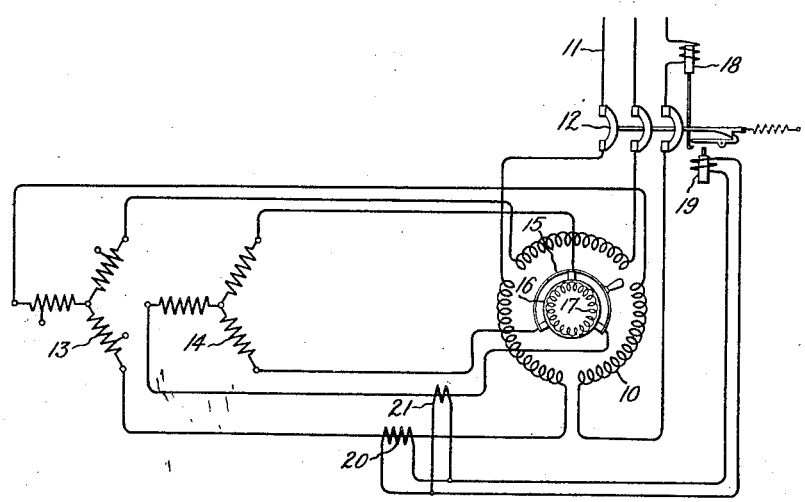
Inventor:
John I. Hull,
by Charles E. Mullen
His Attorney.

Patented July 14, 1931

1,814,809

UNITED STATES PATENT OFFICE

JOHN I. HULL, OF SCHENECTADY, NEW YORK, ASSIGNOR TO GENERAL ELECTRIC COMPANY, A CORPORATION OF NEW YORK

PROTECTIVE SYSTEM FOR ALTERNATING CURRENT COMMUTATOR MOTORS

Application filed April 20, 1928. Serial No. 271,592.

My invention relates to the protection of alternating current dynamo-electric machine installations where a transformer is employed between the primary and secondary circuits of the dynamo-electric machine. More particularly, my invention relates to the protection of such apparatus when, due to certain overload conditions, the machine operating as a motor is liable to become stalled. The invention will be described as applied to an alternating current commutator type motor installation where the primary and secondary windings of the motor are connected in series through a transformer. In such installations it is usual to place a so-called rotor transformer between the primary and secondary so that the secondary rotor of the motor can be built for the comparatively low voltage and the stator primary of the motor for the comparatively high voltage convenient to commercial design.

The primary and secondary of the motor may be considered as a transformer, the transformation ratio of which varies with motor speed such that the rotor voltage becomes zero at synchronous speed and is a maximum at zero speed. Since these machines are not used to regulate the speed down to zero in commercial practice, the rotor transformer is not made of sufficient capacity to withstand the standstill voltage of the rotor, but only a portion of it, for example from 25 to 50%. Consequently if the machine should become stalled the rotary transformer would be subjected to a voltage which might cause serious damage to the rotary transformer. Stalling may occur under certain conditions even though the primary motor current is not excessive so that the usual overload protecting apparatus does not protect the rotary transformer under such conditions.

The object of my invention is to provide protection to the entire apparatus under all conditions and in particular to protect the rotary transformer under stalling conditions. It will appear that should the motor of such an installation become stalled the rotor transformer will be subjected to an excessive voltage causing its core to become saturated and the transformation ratio to be materially altered.

In carrying out my invention I provide protecting means responsive to such a condition. This may be and preferably is combined with the usual motor overload protective device such that the entire apparatus is protected under the various conditions which may arise.

The features of my invention which are believed to be novel and patentable will be pointed out in the claims appended hereto. For a better understanding of the invention reference is made in the following description to the accompanying drawing which represents the preferred embodiment of the invention as used to protect a polyphase commutator motor having a rotor transformer connected between the primary and secondary.

In the drawing the primary winding 10 of the motor has one end of each phase connected to the supply lines 11 through the circuit breaker represented at 12 and the other end of each phase is connected to the primary winding 13 of the rotor transformer. The secondary winding 14 of this transformer is connected to the brushes 15 which connect through the commutator 16 to the secondary rotor winding of the motor represented at 17.

The purpose of the rotor transformer is primarily to reduce the voltage between motor primary and motor secondary so that the motor parts may be efficiently designed and the commutator voltage reduced to a practical value. The motor is essentially a series motor and its speed and torque may be varied by shifting the brushes which are arranged for that purpose.

The volt ampere capacity of the rotor at standstill is the same as the volt ampere capacity of the stator. As in the case of the induction motor, while the rotor is allowed to come from standstill to synchronous speed with the machine carrying load, the output of the rotor decreases from an output equal to the input to the stator at standstill, to zero at synchronous speed. While this is taking place the voltage generated by the rotor likewise decreases from the standstill voltage to zero at synchronous speed. Accordingly as these machines are never used to regulate the speed down to standstill in commercial practice, the rotor transformer is not made of sufficient capacity to withstand the standstill voltage of the rotor, so that in case the machine should be stalled the transformer would be subjected to a voltage which would cause heavy saturation of the iron and large magnetizing current with disastrous results.

It is evident that this condition may result without overloading the motor so as to cause an automatic operation of the overload circuit breaker. Thus, if the brushes are shifted to the low speed position and the motor is stalled, the current drawn from the line would be insufficient to operate the overload circuit breaker relay represented at 18. However, the rotor transformer would be seriously over-excited. By means of my invention the apparatus is protected both for overloads on the motor and for the over-excited condition of the rotor transformer under all conditions.

I have represented the circuit breaker 12 arranged to be opened by two relay devices, the overload relay 18 previously mentioned, and a relay 19, whose function is to open the circuit breaker whenever the rotor transformer becomes seriously over-excited. Relay 19 is connected in parallel to two current transformers 20 and 21 connected in the primary and secondary circuits of the rotor transformer. These two current transformers are connected so that they buck each other and their ratios are inversely proportional to the primary and secondary currents of the rotor transformer circuits under normal conditions so that under these conditions the resultant or differential current flowing to relay 19 is zero or of a negligible value. Now when the rotor transformer becomes over-excited its transformer ratio changes and the primary and secondary currents are no longer in the ratio which produces zero differential current in relay 19. A differential current will flow and operate the relay 19 to open circuit breaker 12. Thus when the magnetizing current of the rotor transformer reaches a predetermined amount (normally an amount obtained after saturation has commenced) this magnetizing current and accordingly the vector sum of the two secondary currents of the current transformers 20 and 21 will reach an amount sufficient to trip the circuit breaker. Instead of measuring the condition of saturation of the rotor transformer by comparing the primary and secondary currents I might measure this condition by comparing the primary and secondary voltages or by any other scheme which will produce a relay operating current when the rotor transformer becomes saturated to an undesirable extent.

In accordance with the provisions of the patent statutes I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. In a protective system a source of alternating current supply, an alternating current commutator motor supplied thereby, a transformer connected between the primary and secondary windings of said motor, a circuit breaker between said motor and source of supply, and means responsive to undesirable saturation of said transformer for opening said circuit breaker.

2. An alternating current commutator machine, a transformer connected between the primary and secondary windings of said machine, an overload circuit breaker for said machine, and means responsive to undesirable saturation of said transformer for opening said circuit breaker.

3. An alternating current commutator motor, a transformer connected between the primary and secondary windings of said motor, a circuit breaker in the primary supply leads of said motor, means responsive to an overload on said motor for opening said circuit breaker, and means responsive to an over-excitation of said transformer for opening said circuit breaker.

4. An alternating current commutator motor, a transformer having its primary winding connected in series with the primary winding of said motor, and its secondary winding connected in series with the secondary winding of said motor, a circuit breaker connected in the supply leads to said motor, a relay for opening said circuit breaker, and means responsive to an over-excited condition of said transformer for energizing said relay to open the circuit breaker.

In witness whereof, I have hereunto set my hand this 19th day of April, 1928.

JOHN I. HULL.